(12) United States Patent
Lau et al.

(10) Patent No.: US 9,077,230 B2
(45) Date of Patent: Jul. 7, 2015

(54) ELECTRIC MOTOR WITH HEAT DISSIPATING DEVICE

(75) Inventors: James Ching Sik Lau, Hong Kong (CN); Xiao Jun Yang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 140 days.

(21) Appl. No.: 13/106,976

(22) Filed: May 13, 2011

(65) Prior Publication Data

US 2011/0278970 A1    Nov. 17, 2011

(30) Foreign Application Priority Data

May 13, 2010    (CN) .......................... 2010 1 0175604

(51) Int. Cl.
| | | |
|---|---|---|
| H02K 9/00 | (2006.01) |
| H02K 9/06 | (2006.01) |
| H02K 11/00 | (2006.01) |
| H02K 5/18 | (2006.01) |

(52) U.S. Cl.
    CPC .............. *H02K 11/0073* (2013.01); *H02K 5/18* (2013.01); *H02K 9/06* (2013.01)

(58) Field of Classification Search
    CPC .............. H02K 9/00; H02K 9/06; H02K 5/18
    USPC .... 310/58, 60 R, 64, 67 R, 68 B, 68 C, 68 D, 310/62, 63
    See application file for complete search history.

(56) References Cited

U.S. PATENT DOCUMENTS

| | | | | |
|---|---|---|---|---|
| 2,845,694 A | * | 8/1958 | Le Tourneau | 242/445.1 |
| 3,200,275 A | * | 8/1965 | Lindgren | 310/90 |
| 3,226,580 A | * | 12/1965 | Oehlrich et al. | 310/57 |
| 3,809,935 A | * | 5/1974 | Kristen et al. | 310/68 R |
| 6,177,740 B1 | * | 1/2001 | Burns | 310/68 R |
| 6,891,292 B2 | | 5/2005 | Raster et al. | |
| 2003/0184172 A1 | * | 10/2003 | Ghiotto | 310/89 |
| 2004/0164625 A1 | * | 8/2004 | Grundl et al. | 310/16 |
| 2007/0241630 A1 | * | 10/2007 | Holmes et al. | 310/217 |

(Continued)

FOREIGN PATENT DOCUMENTS

| | | |
|---|---|---|
| CN | 1477758 A | 2/2004 |
| DE | 19723664 A1 * | 12/1997 |

(Continued)

OTHER PUBLICATIONS

Machine Translation JP06169554 (1994).*

(Continued)

*Primary Examiner* — Jose Gonzalez Quinone
(74) *Attorney, Agent, or Firm* — Muncy, Geissler, Olds & Lowe, P.C.

(57) ABSTRACT

An electric motor has a stator and a rotor rotatably mounted in the stator. The stator includes a stator core and stator windings. A heat dissipating device is mounted around an outer surface of the stator core and configured to absorb heat there from. The heat dissipating device includes a base mounted around the stator core and a plurality of fins extending outwardly from the base in the radial direction. Electronic components are mounted on the heat dissipating device. A fan is mounted on a shaft of the rotor for generating a flow of air inside the stator and through slots between the fins to thereby cool the rotor, stator core, stator windings and electronic components.

16 Claims, 2 Drawing Sheets

(56) References Cited

U.S. PATENT DOCUMENTS

2007/0284157 A1* 12/2007 Heller et al. .................. 180/54.1
2009/0230792 A1* 9/2009 Goetze et al. ................... 310/71

FOREIGN PATENT DOCUMENTS

| JP | 58-212343 A | | 12/1983 |
|----|----|----|----|
| JP | 04087547 A | * | 3/1992 |
| JP | 06169554 A | * | 6/1994 |
| JP | 8-205461 A | | 8/1996 |
| JP | 09093865 A | * | 4/1997 |
| JP | 09252563 A | * | 9/1997 |
| JP | 2002281698 A | * | 9/2002 |
| JP | 2004-222428 A | | 8/2004 |
| WO | WO 2009143946 A1 | * | 12/2009 |

OTHER PUBLICATIONS

Machine Translation JP09093865 (1997) and WO2009143946 (2009).*

* cited by examiner

ELECTRIC MOTOR WITH HEAT DISSIPATING DEVICE

CROSS REFERENCE TO RELATED APPLICATIONS

This non-provisional patent application claims priority under 35 U.S.C. §119(a) from Patent Application No. 201010175604.1 filed in The People's Republic of China on May 13, 2010.

FIELD OF THE INVENTION

This invention relates to an electric motor and in particular, to an electric motor with a heat dissipating device.

BACKGROUND OF THE INVENTION

Generally, small electric motors, such as PMDC motors and electronically commutated DC motors, comprise a stator, a rotor disposed within the stator and a circuit board on which a plurality of electronic components is mounted. The electronic components such as power transistors generate heat during operation of the motor. Usually, an additional heat dissipating device for the electronic components is provided inside the stator. However, the internal space of the motor is limited which limits the size and cooling efficiency of the heat dissipating device.

Hence there is a desire for an electric motor with an improved heat dissipating device for electronic components thereof.

SUMMARY OF THE INVENTION

Accordingly, in one aspect thereof, the present invention provides an electric motor comprising: a stator comprising a stator core and stator windings; a rotor rotatably mounted in the stator and having a shaft; a heat dissipating device mounted around an outer surface of the stator core and configured to absorb heat there from; and electronic components mounted to the heat dissipating device.

Preferably, the heat dissipating device comprises a base mounted around the stator core and a plurality of fins extending radially outwardly from the base.

Preferably, a fan is mounted on the shaft and arranged to generate a flow of air through the inside of the stator core and through slots between the fins.

Preferably, the motor comprises a first end cap located at an axial end of the stator, and the fan is located adjacent an outer side of the first end cap.

Preferably, ends of the fins adjacent the fan axially extend beyond the first end cap to form a receiving space between the ends of the fins and the first end cap, and the fan is located in the receiving space.

Alternatively, the diameter of the fan is larger than the diameter of the base of the heat dissipating device, and the fan is axially spaced from the fins.

Preferably, the motor comprises a second end cap and a plurality of locking members for fixing the end caps to the stator core, the locking members extending through the interior of the stator core.

Preferably, the motor comprises a circuit board to which the electronic components are connected.

Preferably, the electronic components comprise transistors mounted on the heat dissipating device, leads of the transistors being connected to the circuit board.

Preferably, the motor comprises a housing mounted on the outer surface of the stator core and the heat dissipating device is mounted on the housing.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
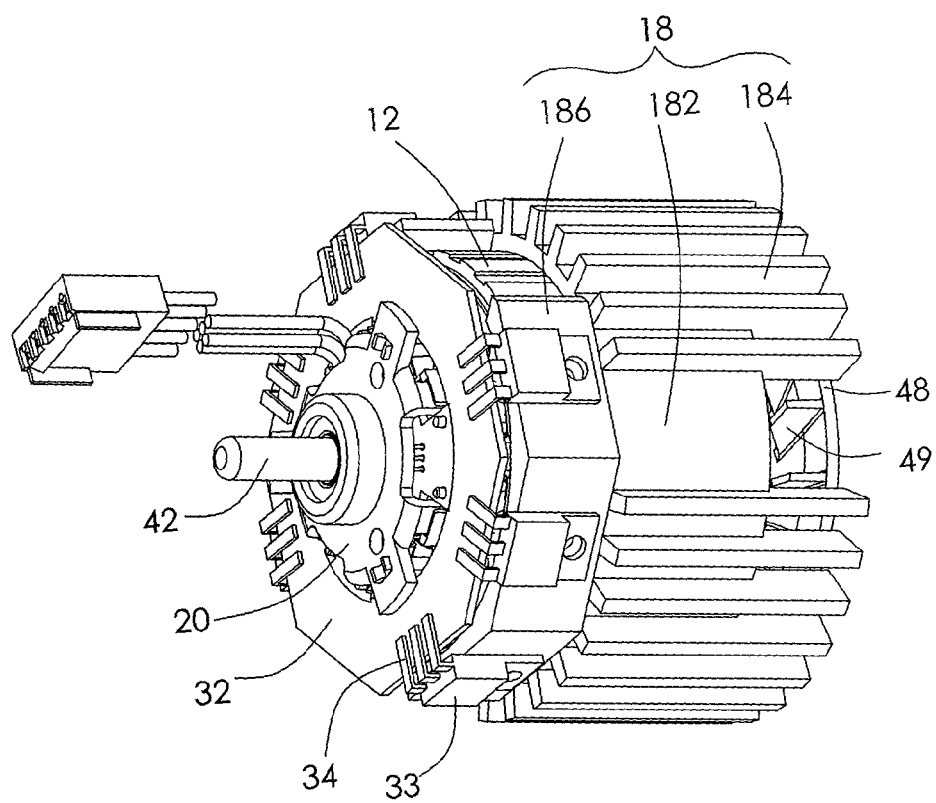
FIG. 1 is an isometric view of a small electronically commutated electric motor in accordance with a first preferred embodiment of the present invention.
Figure 2:
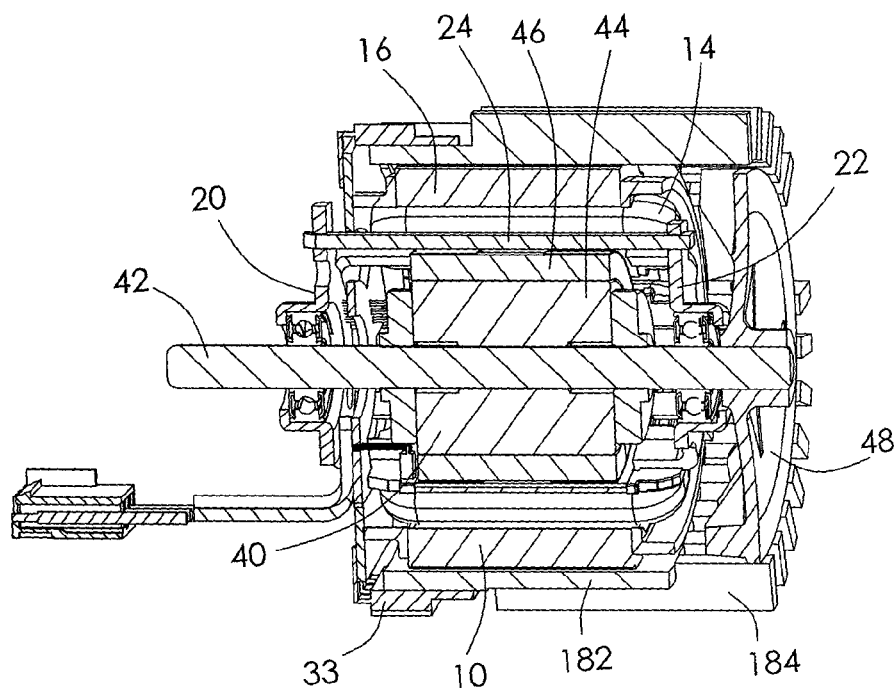
FIG. 2 is an axial sectional view of the motor of FIG. 1.

FIGS. 1 and 2 illustrate a small electronically commutated electric motor, also known as a brushless DC motor, according to a preferred embodiment of the present invention. The term brushless DC motor refers to a motor which has no commutator and is designed to be operated by DC power through the use of electronics to electronically commutate the power supplied to the motor windings. The electronics power the windings with a chopped DC waveform. Recently, the term brushless AC motor has been coined to refer to a brushless DC motor in which the power supplied to the motor windings by the electronics more closely resembles a sinusoidal waveform than a chopped DC waveform. However, the term electronically commutated motor encompass both AC and DC brushless motors while the term brushless AC motor generally covers a special type or subset of brushless DC motors.

The motor comprises a stator 10 and a rotor 40 rotatable relative to and accommodated within the stator 10. The rotor 40 comprises a shaft 42, a rotor core 44 fixed to the shaft 42, and magnets 46 fixed to the radially outer surface of the rotor core 44. The stator 10 comprises a stator core 12 made of magnetic material such as iron. The stator core 12 comprises a yoke 16 and a plurality of teeth extending inwardly from the yoke. Stator windings 14 are wound around the teeth.

A heat dissipating device 18 is provided at the outer surface of the yoke 16. Preferably, the heat dissipating device 18 comprises a cylindrical base 182 and a plurality of spaced fins 184 extending radially and axially from the outer surface of the base 182. The base 182 is mounted on the outer surface of the yoke 16 and has a pair of axial projections 186 formed at one end thereof. Preferably, the base 182 is a press fit on the yoke 16.

The stator 10 further comprises two end caps 20, 22 and several locking members 24 for fixing the end caps 20, 22. The locking members 24 extend through the interior of the stator. Preferably, the locking members 24 extend through respective slots formed between adjacent teeth of the stator core.

The motor further comprises a circuit board 32 and a plurality of electronic components such as power transistors 33 connected to the circuit board 32. The circuit board 32 is located adjacent to and fixed relative to one end cap 20. The transistors 33 are mounted to the outer surface of the projections 186 of the base 182 of the heat dissipating device 18 and leads 34 of the transistors 33 are fixed to the circuit board 32. The transistors may be any suitable power transistors such as MOSFETs.

Ends of the fins 184 remote from the axial projections 186 extend beyond the other end cap 22 in the axial direction. A receiving space is formed between the ends of the fins 184 and the end cap 22. A fan 48 is mounted on one end of the shaft 42 and located in the receiving space. Preferably, the fan 48 is a centrifugal fan comprising several vanes 49 extending radially. When the motor is in operation, airflow generated by the fan 48 flows into the slots formed between adjacent teeth of the stator and the space between the stator and the rotor, then flows out from the end of the motor adjacent to the fan 48 and through the airflow passage formed between the vanes 49 of the fan 48 to thereby cool the rotor core 44, magnets 46, and the stator windings 14. The air exiting from the fan 48 flows through slots formed between the ends of the fins 184 and carries heat away from the fins 184. Thus, heat generated by the transistors 33 is rapidly conducted to the heat dissipating device 18 and then dissipated to the environment. The heat generated within the stator core is partially dissipated through the heat dissipating device 18.

Alternatively, the air may flow in the opposite direction.

Figure 3:
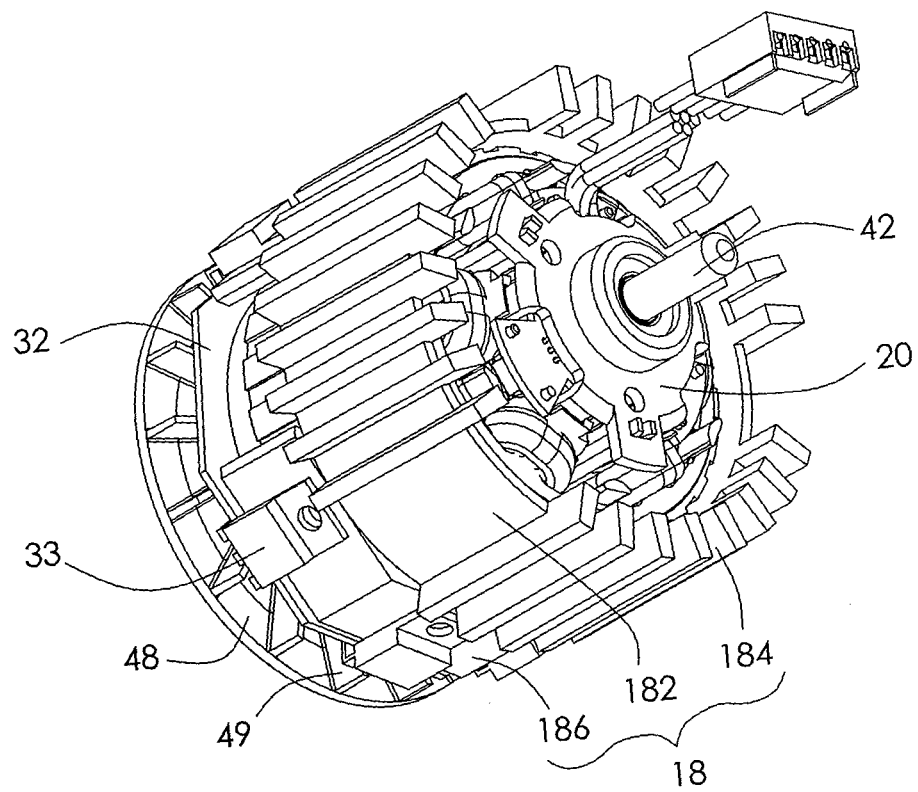
FIG. 3 is an isometric view of a similar motor in accordance with a second preferred embodiment of the present invention.

FIG. 3 shows an electric motor in accordance with a second embodiment of the present invention. The electric motor is similar to the one shown in FIG. 1. However, in this embodiment, the circuit board 32 and the axial projections 186 of the heat dissipating device 18 are located adjacent the fan 48. Also, the diameter of the fan 48 is larger than that of the base 182 of the heat dissipating device 18. The fan 48 is mounted on the end of the shaft 42 and is located outside of the fins 184. When the motor is in operation, airflow generated by the fan 48 flows through the slots formed between adjacent teeth of the stator and the space between the stator and the rotor, and then flows out from the end of the motor through the fan 48. The fan also induces air to flow between the fins 184, thereby cooling the rotor core 44, magnets 46, stator core 12, stator windings 14 and transistors 33.

In the above-mentioned embodiments, the base 182 of the heat dissipating device 18 is mounted on the outer surface of the stator core 12 directly.

Figure 4:
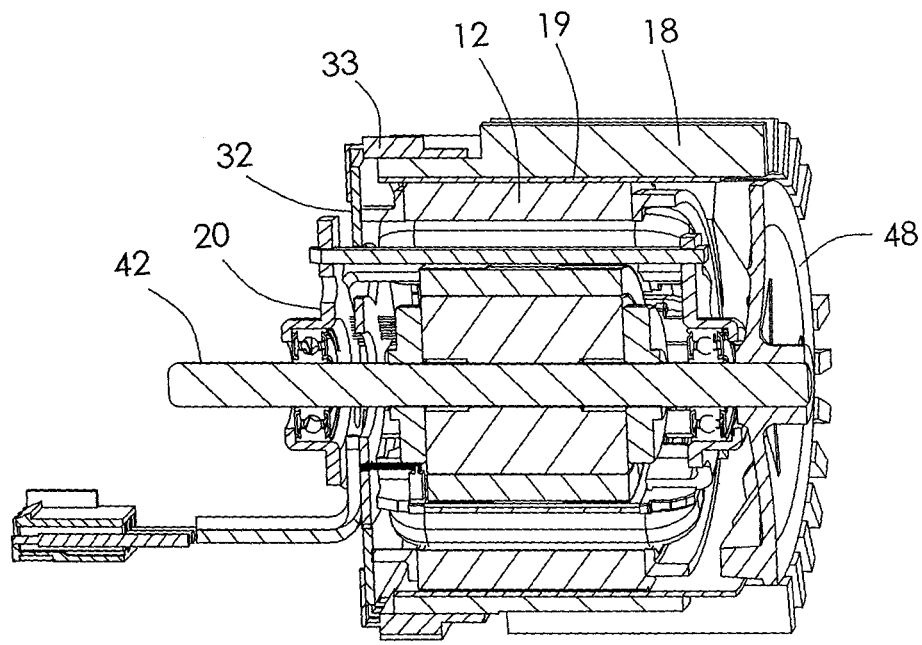
FIG. 4 is an axial sectional view of a similar motor in accordance with a third preferred embodiment of the present invention.

FIG. 4 illustrates an alternative arrangement in which a housing 19 is mounted on the outer surface of the stator core 12 and the heat dissipating device 18 is mounted on the housing 19. The motor of this third preferred embodiment is similar to the motor of FIG. 1 with the exception of the additional housing 19. The housing 19 may be considered as an additional part of the stator core 12. Preferably, the housing 19 is thermally and magnetically conductive and forms a part of the heat path between the stator core and the heat dissipating device as well as a part of the magnetic flux path of the stator. This is specially useful when the stator core is a segmented stator core.

The electric motor of the present invention is suitable for power tools such as drills.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, although the present invention has been described with reference to a small electronically commutated motors, the invention is also applicable to servo motors, stepper motors and other types of electric motors having heat generating electronic components.

The invention claimed is:

1. An electric motor comprising:
   a stator comprising a stator core and stator windings;
   a rotor rotatably mounted in the stator and having a shaft;
   a heat dissipating device mounted around an outer surface of the stator core and configured to absorb heat there from, the heat dissipating device comprising a substantially cylindrical base mounted around the stator core, and a plurality of fins extending radially outwardly from an outer periphery of the base, wherein the base has a first axial end and a second axial end opposite to the first axial end, the base has an opening at the second axial end, and the plurality of fins define a plurality of air passages extending from positions adjacent to the first axial end towards the second axial end of the base;
   a circuit board located at the opening of the base, the circuit board having a through hole at a central portion thereof;
   an end cap located at an outer side of the circuit board such that the circuit board is located between the end cap and the stator, the end cap fixed to the stator and having a bearing supporting the shaft of the rotor;
   at least one electronic component mounted to a radially outer surface of the base of the heat dissipating device adjacent to the second axial end of the base, and aligned to at least one air passage of the heat dissipating device in an axial direction of the stator; and
   a fan mounted on the shaft and arranged to generate a flow of air through an interior of the stator core and the air passages between the fins,
   wherein the at least one electronic component is electrically connected to the circuit board, and
   wherein the plurality of fins have first ends extend axially beyond the end cap, defining a receiving space between the first ends of the plurality of fins and the end cap, and wherein the fan is completely located in the receiving space.

2. The motor of claim 1, wherein the fan is located adjacent to an outer side of the end cap.

3. The motor of claim 2, wherein the diameter of the fan is larger than the diameter of the base of the heat dissipating device, and the fan is axially spaced from the fins.

4. The motor of claim 1, further comprising a housing mounted on the outer surface of the stator core and the base of the heat dissipating device is mounted on the housing.

5. The motor of claim 1, wherein the base comprises at least one projection at an lateral periphery thereof, and the at least one electronic component is mounted to an outer surface of the at least one projection of the base.

6. The motor of claim 1, wherein the first ends of the plurality of fins extend radially inward at an end surface of the axial end of the base, and each fin has an increased radial width at the first end with respect to the remaining portions.

7. An electric motor comprising:
   a stator comprising a stator core and stator windings wound on the stator core;
   a rotor rotatably mounted in the stator and having a shaft;

a heat dissipating device mounted around an outer surface of the stator core and having a substantially cylindrical base surrounding the stator core and a plurality of fins extending radially outwardly from an outer periphery of the base, wherein the base has an axial end;

a circuit board located at the axial end of the base;

a fan arranged to generate an airflow flows between the plurality of fins; and at least one electronic component mounted to and thermally contacting an outer surface of the base of the heat dissipating device adjacent to the circuit board, wherein the at least one electronic component has conductive portions extending over a circumferential surface of the circuit board and electrically connected to the circuit board, the circumferential surface is parallel to the shaft, wherein at least one of the plurality of fins has a first axial end adjacent to the electronic component and a second axial end located farther from the electronic component than the first axial end, and wherein the fan and the plurality of fins are located at two axial ends of the at least one electronic component, respectively.

8. The motor of claim 7, wherein the base has an another axial end opposite to the axial end, the plurality of fins have first ends extending axially beyond the another axial end of the base.

9. The motor of claim 7, further comprising a housing mounted on the outer surface of the stator core and the base of the heat dissipating device is mounted on the housing.

10. The motor of claim 7, wherein the base comprises at least one projection at an lateral periphery thereof, and the at least one electronic component is mounted to an outer surface of the at least one projection of the base.

11. The motor of claim 7, wherein the at least one of the plurality of fins is axially aligned with the at least one electronic component.

12. The motor of claim 1, wherein at least one of the fins has a radially outmost end which is located farther from the stator core than a radially outmost end of the at least one electronic component.

13. The motor of claim 1, wherein the at least one electronic component and the fan are located at two axial ends of the plurality of fins, respectively.

14. The motor of claim 1, wherein the fan and the fins are located at two axial ends of the at least one electronic component, respectively.

15. The motor of claim 1, further comprising an another end cap and a plurality of locking members, wherein the stator core has a plurality of teeth spaced from each other with a plurality of slots defined between the plurality of teeth, the locking members extend though respective slots and connect the end cap and the another end cap together.

16. The motor of claim 4, wherein the outer surface of the stator core forms a plurality of ribs extending in axial direction of the stator core, the ribs are spaced along a circumferential direction of the stator core, and the base is press fitted on the ribs of the stator core.

* * * * *